(12) United States Patent
Sato et al.

(10) Patent No.: US 8,091,384 B2
(45) Date of Patent: Jan. 10, 2012

(54) METHOD OF MANUFACTURING SILICA GLASS CRUCIBLE FOR PULLING SILICON SINGLE CRYSTALS

(75) Inventors: Tadahiro Sato, Akita (JP); Masaki Morikawa, Akita (JP)

(73) Assignee: Japan Super Quartz Corporation, Akita-Ken (JP)

( * ) Notice: Subject to any disclaimer, the term of this patent is extended or adjusted under 35 U.S.C. 154(b) by 392 days.

(21) Appl. No.: 12/351,115

(22) Filed: Jan. 9, 2009

(65) Prior Publication Data

US 2010/0107691 A1 May 6, 2010

(30) Foreign Application Priority Data

Oct. 31, 2008 (JP) ................................. 2008-281170

(51) Int. Cl.
*C03B 19/00* (2006.01)
(52) U.S. Cl. ............. 65/17.3; 65/17.4; 65/17.5; 65/17.6
(58) Field of Classification Search ........... 65/17.3–17.6
See application file for complete search history.

(56) References Cited

U.S. PATENT DOCUMENTS

| 2002/0166341 A1 | 11/2002 | Shelley et al. | |
| 2005/0257736 A1* | 11/2005 | Shimosaka et al. | ............ 117/217 |
| 2010/0154701 A1* | 6/2010 | Kemmochi et al. | ............ 117/208 |

FOREIGN PATENT DOCUMENTS

| JP | 1-57427 | 6/1989 |
| JP | 1-160836 | 6/1989 |
| JP | 09-157082 | 6/1997 |
| JP | 2001-002430 | 1/2001 |
| JP | 2001-328831 | 11/2001 |
| JP | 2001-342029 | 12/2001 |

OTHER PUBLICATIONS

Machine Translatin of JP 2001-002430.*
English language Abstract of JP1-160836, Jun. 23, 1989.
English language Abstract of 2001-002430, Jan. 9, 2001.
English language Abstract of 1-57427, Jun. 20, 1989.
English language Abstract of 2001-328831, Nov. 27, 2001.
U.S. Appl. No. 12/303,134, filed Dec. 2, 2008, and entitled "Method and Apparatus for Manufacturing Vitreous Silica Crucible."
Machine translation of Japanese patent document 2001-342029.
Machine translation of Japanese patent document 09-157082.

* cited by examiner

*Primary Examiner* — Matthew Daniels
*Assistant Examiner* — Russell Kemmerle, III
(74) *Attorney, Agent, or Firm* — Greenblum & Bernstein, P.L.C.

(57) ABSTRACT

The disclosed is a method of manufacturing a silica glass crucible for pulling silicon single crystals. In the method, reduced pressure is imparted from the inner surface to the outer surface of a crucible-shaped molded product and the crucible-shaped molded product is arc-fused while rotating the same to form a silica glass crucible with a transparent layer on the inner surface side and a bubble layer on the outer surface side. The inner surface of the wall portion of the silica glass crucible is fused a second time by arc fusion to cause bubbles present in the transparent layer of the inner surface of the wall portion to be displaced toward the bottom portion of the inner surface of the wall portion. The inner surface of the bottom portion of the silica glass crucible is fuse a second time by arc fusion to cause bubbles present in the transparent layer of the inner surface of the bottom portion to be displaced toward the periphery of the inner surface of the bottom portion. Either the step of displacement toward the bottom portion or the step of displacement toward the outer periphery is inverted first.

12 Claims, No Drawings

METHOD OF MANUFACTURING SILICA GLASS CRUCIBLE FOR PULLING SILICON SINGLE CRYSTALS

CROSS-REFERENCE TO RELATED APPLICATIONS

This application claims benefit of priority under 35 USC 119 to Japanese Patent Application No. 2008-281170 filed on Oct. 31, 2008, which is expressly incorporated herein by reference in its entirety.

BACKGROUND OF THE INVENTION

1. Field of the Invention

The present invention relates to a method of manufacturing a silica glass crucible for pulling silicon single crystals. In particular, the present invention relates to a method of manufacturing a silica glass crucible for pulling silicon single crystals permitting the manufacturing of a silica glass crucible that has a smooth inner surface and that is capable of producing silicon single crystals at high yield when used to pull silicon single crystals.

2. Discussion of the Background

The silicon single crystals that are employed as the substrates of semiconductor devices are generally manufactured by the Czochralski method (CZ method). In the CZ method, a polycrystalline silicon starting material is charged to a silica glass crucible for pulling silicon single crystals, the silicon starting material is peripherally heated and melted, and a seed crystal suspended from above is brought into contact with the silicon melt and pulled.

Conventional silica glass crucibles are formed by a method such as fusion under reduced pressure. With employing a silica glass crucible fabricated by this method, bubbles are generated in the transparent layer when a high temperature is reached during silicon single crystal pulling, and the silica glass crucible deforms and is corroded from the surface by the silicon melt. This corrosion exposes bubbles in the transparent layer (inner layer) of the silica glass crucible at the interface with the silicon melt. Single crystallization becomes unstable, resulting in a problem in the form of a diminished single crystallization yield.

Specifically, when minute bubbles are present near the inner surface of a silica glass crucible, those bubbles that are present near the opening of the silica glass crucible expand during pulling of a single crystal, splitting open and dropping into the melt, or coming into contact with the silicon melt in the silica glass crucible, resulting in portions containing bubbles being abruptly damaged. These phenomena are thought to diminish the single crystallization yield of silicon single crystals.

Accordingly, various manufacturing methods that eliminate bubbles in the transparent layer of the silica glass crucible have been examined in recent years. Silica glass crucibles are normally manufactured by the rotating arc fusion method under reduced pressure (Japanese Unexamined Patent Publication (KOKAI) Heisei No. 1-160836 (D 1)). Various improvements in this manufacturing device and changes in the silica starting material have been investigated, but the complete elimination of bubbles has yet to be achieved.

Accordingly, a method for manufacturing a silica glass crucible for pulling silicon single crystals has been proposed that permits the manufacturing of a silica glass crucible with an inner surface from which residual bubbles have been completely eliminated and cannot be found by visual or microscopic examination; in which bubble nuclei that generate bubbles during use are substantially absent in the vicinity of the inner surface; and in which the inner surface is smooth and yields a high crystallization rate (DF rate) (Japanese Unexamined Patent Publication (KOKAI) No. 2001-002430 (D 2)).

This method is characterized in that the entire inner surface of a silica glass crucible is mechanically ground and the inner surface is fused a second time by arc fusion. The silica glass crucible is one manufactured by a method of manufacturing a silica glass crucible for pulling silicon single crystals by feeding a quartz starting material powder into a rotating mold to form a shaped molded product and by arc-fusing the molded product to give a crucible. D 2 states that this method permits the manufacturing of a silica glass crucible with an inner surface from which residual bubbles have been completely eliminated and thus cannot be found by visual or microscopic examination, in which bubble nuclei that generate bubbles during use are substantially absent in the vicinity of the inner surface, and in which the inner surface is smooth and yields a high DF rate.

As an example of a manufacturing method that eliminates bubbles from the transparent layer of a silica glass crucible, Japanese Unexamined Patent Publication (KOKAI) Heisei No. 1-157427 (D 3) describes a method of manufacturing a silica glass crucible by feeding a quartz starting material powder into a mold that is permeable to air; forming a crucible-shaped molded product; reducing the pressure; and feeding hydrogen gas, helium gas, or a mixed gas thereof at the beginning of fusion. Based on this method, the hydrogen and helium gases diffuse into the transparent layer of the silica glass crucible, gases other than these gases do not diffuse, and the gases in the bubbles that are formed during fusion by heating can be eliminated by diffusion to the exterior from within the quartz glass. However, the same problems as in the above-described manufacturing method are encountered when manufacturing a silica glass crucible by feeding helium gas from the start to the end of fusion. When hydrogen gas or a mixed gas of hydrogen and helium gas is fed from the start to the end of fusion to manufacture a silica glass crucible, although the expansion of gas bubbles can be inhibited during the pulling of a silicon single crystal, a layer of minute bubbles of about 1 mm remains in the outer transparent layer and the number of bubbles is unlimited and thus cannot be made to approach zero.

A method of manufacturing a silica glass crucible for pulling silicon single crystals that is characterized by feeding a quartz starting material powder into a rotating mold, forming a crucible-shaped product, arc-fusing the crucible-shaped product to obtain a fused crucible, grinding the entire inner surface of the fused crucible, and heat treating the ground surface with an oxyhydrogen burner has been proposed (Japanese Unexamined Patent Publication (KOKAI) No. 2001-328831 (D 4)).

D 4 states that this method provides a method of manufacturing a silica glass crucible for pulling silicon single crystals that yields a high single crystallization rate without generating dislocations and without entraining bubbles in the single crystals that are pulled even when pulling silicon single crystals.

As set forth above, no silica glass crucible from which all bubbles have been completely removed has yet been achieved. Further, even when the bubbles in the transparent layer are markedly reduced compared to a conventional silica glass crucible, the single crystallization yield of silicon single crystals of which high quality is demanded has not been enhanced to a fully satisfactory degree.

In the methods of manufacturing silica glass crucibles for pulling silicon single crystals described in above-cited D 2 and D4, the entire inner surface is ground to remove bubbles in the transparent layer of the silica glass crucible. However, grinding of the entire inner surface is an operation that requires a considerable amount of time and labor, creating a problem by requiring post-processing to smooth out the surface following grinding.

Accordingly, the present invention has for its object to provide a new method for manufacturing a silica glass crucible for pulling silicon single crystals that reduces the quantity of bubbles in the transparent layer without grinding the entire inner surface.

SUMMARY OF THE INVENTION

The present invention relates to a method of manufacturing a silica glass crucible for pulling silicon single crystals, characterized by comprising the steps of:

feeding a quartz starting material powder into a rotating mold and forming a crucible-shaped molded product;

imparting reduced pressure from the inner surface to the outer surface of the crucible-shaped molded product and arc-fusing the crucible-shaped molded product while rotating the same to form a silica glass crucible with a transparent layer on the inner surface side and a bubble layer on the outer surface side (silica glass crucible-forming step) (wherein the reduced pressure is applied during at least part of the arc fusion process);

fusing a second time by arc fusion the inner surface of the wall portion of the silica glass crucible to cause bubbles present in the transparent layer of the inner surface of the wall portion to be displaced toward the bottom portion of the inner surface of the wall portion (step of displacement toward the bottom portion); and fusing a second time by arc fusion the inner surface of the bottom portion of the silica glass crucible to cause bubbles present in the transparent layer of the inner surface of the bottom portion to be displaced toward the periphery of the inner surface of the bottom portion (step of displacement toward the outer periphery); and in that either the step of displacement toward the bottom portion or the step of displacement toward the outer periphery can be inverted first to obtain a silica glass crucible in which bubbles are accumulated in the corner portions of the transparent layer formed on the inner surface of the wall portion and the inner surface of the bottom portion.

The present invention provides a new method of manufacturing a silica glass crucible for pulling silicon single crystals by which the quantity of bubbles in the transparent layer is reduced without grinding the entire inner surface. Silicon single crystals can be pulled with a high single crystallization rate with the silica glass crucible obtained by the manufacturing method of the present invention.

Other exemplary embodiments and advantages of the present invention may be ascertained by reviewing the present disclosure.

DESCRIPTIONS OF THE EMBODIMENTS

The following preferred specific embodiments are, therefore, to be construed as merely illustrative, and not limitative of the remainder of the disclosure in any way whatsoever. In this regard, no attempt is made to show structural details of the present invention in more detail than is necessary for the fundamental understanding of the present invention, the description making apparent to those skilled in the art how the several forms of the present invention may be embodied in practice.

[Aspect 1]

The method of manufacturing a silica glass crucible for pulling silicon single crystals of the present invention comprises the step of feeding a quartz starting material powder into a rotating mold and forming a crucible-shaped molded product, and the step of imparting reduced pressure from the inner surface to the outer surface of the crucible-shaped molded product and arc-fusing the crucible-shaped molded product while rotating the same to form a silica glass crucible with a transparent layer in the inner surface side and a bubble layer on the outer surface side (silica glass crucible-forming step). The method of feeding a quartz starting material powder into a rotating mold, forming a crucible-shaped molded product, and then arc-fusing the molded product is also known as the rotating arc fusion method. There are a number of variations on the rotating arc fusion method; any rotating arc fusion method of manufacturing a silica glass crucible having a transparent layer on the inner surface side and a bubble layer on the outer surface side can be employed in the method of the present method without specific limitation. The reduced pressure in the silica glass crucible-forming step is normally applied during at least part of the arc fusion process.

In a silica glass crucible in which a transparent layer is present on the inner surface side and a bubble layer is present on the outer surface side, manufactured by the above-described rotating arc fusion method, it is desirable to make every effort to prevent bubbles from being present in the transparent layer on the inner surface side. Various attempts have been made to eliminate these bubbles. However, bubbles or a bubble layer (0.1 to 1 mm in thickness, for example) is normally present in the transparent layer on the inner surface side of a silica glass crucible having a transparent layer on the inner surface side and a bubble layer on the outer surface side that is manufactured by the above-described rotating arc fusion method. In the method of the present invention, a state is created that facilitates displacement of the bubbles or bubble layer (0.1 to 1 mm in thickness, for example) that is present in the transparent layer on the inner surface side of the silica glass crucible by fusing the inner surface side a second time, and a force is applied to displace the bubbles the displacement of which has been facilitated so that they are accumulated in the corner portions of the transparent layer. Specifically, by incorporating a step of fusing a second time by arc fusion the inner surface of the wall portion of the silica glass crucible to cause bubbles present in the transparent layer of the inner surface of the wall portion to be displaced toward the bottom portion of the inner surface of the wall portion (step of displacement toward the bottom portion) and a step of fusing a second time by arc fusion the inner surface of the bottom portion of the silica glass crucible to cause bubbles present in the transparent layer of the inner surface of the bottom portion to be displaced toward the periphery of the inner surface of the bottom portion (step of displacement toward the outer periphery), a silica glass crucible in which bubbles are accumulated in the corner portions of the transparent layer formed on the inner surface of the wall portion and the inner surface of the bottom portion is obtained. It does not matter whether the step of displacement toward the bottom portion or the step of displacement toward the outer periphery is performed first.

The step of displacement toward the bottom portion is a process of accumulating the bubble layer (0.5 to 1 mm in thickness, for example) immediately beneath the inner surface of the silica glass crucible in a band near the bottom portion (corner portion) of the wall portion. Specifically, the inner surface of the wall portion of the silica glass crucible is fused a second time by arc fusion to cause bubbles that are present in the transparent layer of the inner surface of the wall portion to be displaced toward the bottom portion of the inner surface of the wall portion. In the course of fusing the quartz glass a second time by arc fusion while rotating the silica glass crucible, when gravity prevails in the balance between the viscosity of the quartz glass being fused a second time, the centrifugal force created by rotation, and gravity, the bubble layer that is directly beneath the inner surface of the wall portion is displaced toward the bottom portion (drops). Since gravity is essentially constant, a low temperature during this second fusion increases the viscosity of the quartz glass that is being fused a second time, tending to strongly inhibit dropping of the bubble layer. The centrifugal force becomes excessively strong when the rotational speed of the silica glass crucible is too high, tending to strongly inhibit dropping of the bubble layer. Thus, in the step of displacement toward the bottom portion, the rotational speed of the silica glass crucible is desirably made lower than the rotational speed during arc fusion of the crucible-shaped molded product, and the temperature when fusing the silica glass crucible a second time is desirably made higher than the temperature during arc fusion of the crucible-shaped molded product to lower the viscosity.

From this perspective, the rotational speed during arc fusion of the crucible-shaped molded product is desirably set so that the gravitational acceleration exerted on the crucible-shaped molded product is 1.3 G or greater, and the rotational speed of the silica glass crucible in the step of displacement toward the bottom portion is desirably set so that the gravitational acceleration exerted on the silica glass crucible is less than 1.3 G.

Table 1 below gives the relation between the rotational speed and the gravitational acceleration (about 1.2 G, about 1.5 G, and about 1.8 G) for silica glass crucibles 25 inches (about 650 mm), 33 inches (about 850 mm), and 37 inches (about 950 mm) in outer diameter. The gravitational acceleration can be suitably set by means of the rotational speed based on the diameter of the silica glass crucible; a rotational speed can be suitably set to produce a gravitational acceleration suited to dropping of the bubble layer of the wall portion along the inner surface of the wall portion.

TABLE 1

| Outer diameter | Rotational speed of silica glass crucible | | |
| --- | --- | --- | --- |
| | about 1.2 G | about 1.5 G | about 1.8 G |
| 25 inches | 60 rpm | 64 rpm | 70 rpm |
| 33 inches | 50 rpm | 56 rpm | 62 rpm |
| 37 inches | 48 rpm | 53 rpm | 58 rpm |

The second fusing by arc fusion and the rotational speed of the silica glass crucible are set to create conditions under which the bubble layer in the wall portion will drop along the inner surface of the wall portion. The second fusing by arc fusion is suitably conducted, by way of example, at a temperature of about 2,000° C.±200° C., desirably at a temperature of about 2,100° C.±100° C. The temperature during arc fusion of the crucible-shaped molded product is normally about 1,800° C.

The step of displacement toward the outer periphery is a step in which the inner surface of the bottom portion of the silica glass crucible is fused a second time by arc fusion to cause bubbles that are present in the transparent layer of the inner surface of the bottom portion to be displaced toward the outer periphery of the inner surface of the bottom portion. In the step of displacement toward the outer periphery, the rotational speed of the silica glass crucible is desirably made greater than the rotational speed during arc fusion of the crucible-shaped molded product to increase the centrifugal force, and the second fusion temperature of the silica glass crucible is desirably made higher than the temperature during arc fusion of the crucible-shaped molded product to lower the viscosity and cause the bubbles to be displaced toward the outer periphery of the inner surface of the bottom portion.

Specifically, the rotational speed during arc fusion of the crucible-shaped molded product is desirably set so that the gravitational acceleration exerted on the crucible-shaped molded product is 1.7 G or less, and the rotational speed of the silica glass crucible in the step of displacement toward the outer periphery is desirably set so that the gravitational acceleration exerted on the silica glass crucible exceeds 1.7 G from the perspective of facilitating displacement of bubbles toward the outer periphery of the inner surface of the bottom portion. The gravitational acceleration can be suitably set by means of the rotational speed by referencing the values in Table 1 based on the diameter of the silica glass crucible, and a rotational speed generating a gravitational acceleration can be suitably set to cause bubbles in the inner surface of the bottom portion to be displaced toward the outer periphery.

The second fusing by arc fusion and the rotational speed of the silica glass crucible are set to create conditions under which the bubble layer in the bottom portion will be displaced toward the outer periphery. The second fusing by arc fusion is suitably conducted, by way of example, at a temperature of about 2,000° C.±200° C., desirably at a temperature of about 2,100° C.±100° C. The temperature during arc fusion of the crucible-shaped molded product is normally about 1,800° C.

It does not matter which of the above two steps—namely, the step of displacement toward the bottom portion and the step of displacement toward the outer periphery—is performed first. Through these two steps, a bubble layer is accumulated in a band near the bottom (corner portion) of the wall portion. The rotational speed and second fusion temperature in the step of displacement toward the bottom portion and in the step of displacement toward the outer periphery, as well as the duration of the processing (step), are suitably controlled so that the width of this band falls, for example, within a range of 1 to 30 cm, desirably a range of 5 to 25 cm, and preferably, within a range of 10 to 20 cm. A silica glass crucible in which a band-like bubble layer has been accumulated near the bottom portion (corner portion) of the wall portion can be used without modification as a silica glass crucible for pulling silicon single crystals. High single crystallization yields of silicon single crystals can be achieved because bubbles have been reduced in the portion of the inner surface of the wall portion coming into contact with the liquid surface of the silicon melt and in the center portion of the bottom portion.

[Aspect 2]

The present invention includes a method of manufacturing a silica glass crucible for pulling silicon single crystals further comprising the removal of the bubbles accumulated in the corner portions of the transparent layer in a silica glass crucible obtained by the manufacturing method of Aspect 1. The bubbles can be removed by, for example, grinding, etching, or secondary fusing (rearc-fusing).

Grinding can be conducted with, for example, a sand blaster or a grinder or the like. Etching can be conducted with, for example, hydrofluoric acid or the like.

The bubbles present in the silica glass crucible obtained by the manufacturing method of Aspect 1 of the present invention are accumulated in a band, for example, near the bottom portion (corner portion) of the wall portion. Generally, in a silica glass crucible manufactured by the rotating arc fusion method, the transparent layer near the bottom portion (corner portion) of the wall portion is thick. Accordingly, even when bubbles are accumulated in a band in this portion and removed by grinding or etching, the thickness of the transparent layer in the corner portion following removal can be kept to within a range that does not differ greatly from the thickness of the transparent layer in the wall portion and bottom portion.

Since the method of the present invention removes the bubbles that have accumulated in the corner portion, the grinding step or the like can be completed more rapidly than when grinding the entire inner surface. Further, since the ground or etched surface remains only near the bottom portion of the wall portion (corner portion), use as a silica glass crucible for pulling silicon single crystals is possible without modifying the ground or etched surface.

However, it is desirable to fuse (rearc fuse) the ground or etched surface a second time after grinding or etching to render it smooth. The second fusing (rearc-fusing) following grinding or etching can be conducted by the usual methods, such as arc fusion in a hydrogen atmosphere or in a hydrogen-containing gas.

In the present invention, it is possible to remove the bubbles by just fusing (rearc-fusing) a second time, without grinding or etching. The second fusing (rearc-fusing) can be conducted by the usual methods, but is desirably conducted, by way of example, by inclining an electrode so that the arc is concentrated on the bubble layer accumulated near the lower portion (corner portion) of the wall portion (fusing (rearc-fusing) a second time can also be similarly conducted after grinding or etching). The second fusing (rearc-fusing) can also be conducted as arc-fusing in a hydrogen atmosphere or in a hydrogen-containing gas.

Since just the bubble layer that has accumulated in the corner portion is removed by the second fusing (rearc-fusing) in the method of the present invention, the second fusing step can be conducted more rapidly than when fusing (rearc-fusing) the entire inner surface a second time.

The present invention will be described in greater detail below through embodiments.

Embodiment 1

Silica powder was charged to a crucible mold 850 mm in inner diameter that was being rotated at 56 rpm. When charging had been completed, an arc fusion device was employed to fuse the powder at a temperature of 1,800° C. while rotating the crucible mold at 56 rpm. For three minutes immediately following the start of fusion, a vacuum was drawn through holes formed in the crucible mold and a transparent layer was formed. Following the formation of the transparent layer, drawing of the vacuum was halted and a bubble layer 13 mm in thickness was formed.

Subsequently, the rotational speed of the crucible mold was reduced to 50 rpm and fusion was conducted a second time for 30 seconds at 2,130° C. to accumulate the bubbles that were immediately beneath the inner surface of the wall portion of the crucible in the corner portion. The rotational speed of the crucible mold was then increased to 66 rpm, fusing was conducted a second time for 30 seconds, and the bubbles immediately beneath the inner surface of the bottom portion of the crucible were accumulated in a corner portion about 6 cm in width. When the fusion had ended, the crucible was cooled and removed from the crucible mold.

The bubble band portion of the crucible that had been removed from the crucible mold was sand blasted over a width of 10 cm to grind away a thickness of 1 mm. The grinding marks on the inner surface of the crucible were converted to a lustrous, smooth surface by arc-fusing the inner surface a second time at a temperature of 1,800° C. with an arc fusion device, yielding a finished product.

Embodiment 2

Silica powder was charged to a crucible mold 650 mm in inner diameter that was being rotated at 72 rpm. When charging had been completed, an arc fusion device was employed to fuse the powder at a temperature of 1,800° C. while rotating the crucible mold at 72 rpm. For two minutes immediately following the start of fusion, a vacuum was drawn through holes formed in the crucible mold and a transparent layer was formed. Following the formation of the transparent layer, drawing of the vacuum was halted and a bubble layer 9 mm in thickness was formed.

Subsequently, the rotational speed of the crucible mold was reduced to 60 rpm and fusion was conducted a second time for 30 seconds at 2,200° C. to accumulate the bubbles that were immediately beneath the inner surface of the wall portion of the crucible in the corner portion. The rotational speed of the crucible mold was then increased to 78 rpm, fusion was conducted a second time for 20 seconds, and the bubbles immediately beneath the inner surface of the bottom portion of the crucible were accumulated in a corner portion about 3 cm in width. When the fusion had ended, the crucible was cooled and removed from the crucible mold.

The bubble band portion of the crucible that had been removed from the crucible mold was ground over a width of 4 cm to grind away a thickness of 1.5 mm. The grinding marks on the inner surface of the crucible were converted to a lustrous, smooth surface by fusing the inner surface a second time at a temperature of 1,800° C. with an arc fusion device, yielding a finished product.

Embodiment 3

Silica powder was charged to a crucible mold 850 mm in inner diameter that was being rotated at 56 rpm. When charging had been completed, an arc fusion device was employed to fuse the powder at a temperature of 1,800° C. while rotating the crucible mold at 56 rpm. For three minutes immediately following the start of fusion, a vacuum was drawn through holes formed in the crucible mold and a transparent layer was formed. Following the formation of the transparent layer, drawing of the vacuum was halted and a bubble layer 15 mm in thickness was formed.

Subsequently, the rotational speed of the crucible mold was increased to 62 rpm and fusion was conducted a second time for 20 seconds at 2,090° C. to accumulate the bubbles that were immediately beneath the inner surface of the bottom portion of the crucible in the corner portion. The rotational speed of the crucible mold was then reduced to 50 rpm, fusion was conducted a second time for 15 seconds, and the bubbles immediately beneath the inner surface of the wall portion of the crucible were accumulated in a corner portion about 20 cm in width. When the fusion had ended, the crucible was cooled and removed from the crucible mold.

The crucible that had been removed from the crucible mold was tilted, 25 percent hydrofluoric acid was applied over a 15 cm width of the bubble band portion, and 1 mm of the inner surface was etched away. The etching marks on the inner surface of the crucible were converted to a lustrous, smooth surface by fusing the inner surface a second time at a temperature of 1,800° C. with an arc fusion device, yielding a finished product.

Embodiment 4

Silica powder was charged to a crucible mold 950 mm in inner diameter that was being rotated at 56 rpm. When charging had been completed, a three-phase current arc fusion device was employed to fuse the powder at a temperature of 1,800° C. while rotating the crucible mold at 56 rpm. For four minutes immediately following the start of fusion, a vacuum was drawn through holes formed in the crucible mold and a transparent layer was formed. Following the formation of the transparent layer, drawing of the vacuum was halted and a bubble layer 19 mm in thickness was formed.

Subsequently, the rotational speed of the crucible mold was reduced to 48 rpm and fusion was conducted a second time for 30 seconds at 1,970° C. to accumulate the bubbles that were immediately beneath the inner surface of the wall portion of the crucible in the corner portion. The rotational speed of the crucible mold was then increased to 62 rpm, fusion was conducted a second time for 30 seconds, and the bubbles immediately beneath the inner surface of the bottom portion of the crucible were accumulated in a corner portion about 16 cm in width. When the fusion had ended, the crucible was cooled and removed from the crucible mold.

The bubble band portion on the inner surface of the crucible that had been removed from the crucible mold was heated to 2,400° C. with an arc device comprised of two gouging electrodes to induce vaporization, thereby being ground down to a depth of 1 mm. A finished product was thus obtained.

Embodiment 5

Silica powder was charged to a crucible mold 850 mm in inner diameter that was being rotated at 56 rpm. When charging had been completed, an arc fusion device was employed to fuse the powder at a temperature of 1,800° C. while rotating the crucible mold at 56 rpm. For three minutes immediately following the start of fusion, a vacuum was drawn through holes formed in the crucible mold and a transparent layer was formed. Following the formation of the transparent layer, drawing of the vacuum was halted and a bubble layer 13 mm in thickness was formed.

Subsequently, while rotating the crucible mold at 62 rpm, fusion was conducted a second time for 30 seconds at 2,070° C. to accumulate the bubbles that were immediately beneath the inner surface of the bottom portion of the crucible in the corner portion. Then, while rotating the crucible mold at 50 rpm, fusion was conducted a second time for 30 seconds at a temperature of 2,100° C., and the bubbles immediately beneath the inner wall surface of the crucible were accumulated in the corner portion. A band of bubbles about 10 cm wide was thus formed in the corner portion. When the fusion had ended, the crucible was cooled and removed from the crucible mold, yielding a finished product.

Comparative Example 1

Conventional Manufacturing Method

Silica powder was charged to a crucible mold 850 mm in inner diameter that was being rotated at 56 rpm. When charging had been completed, an arc fusion device was employed to fuse the powder at a temperature of 1,800° C. while rotating the crucible mold at 56 rpm. For three minutes immediately following the start of fusion, a vacuum was drawn through holes formed in the crucible mold and a transparent layer was formed. Following the formation of the transparent layer, drawing of the vacuum was halted, a bubble layer 13 mm in thickness was formed, and the arc fusion was halted. Following the end of fusion, the crucible was cooled and removed from the crucible mold.

The 1 mm inner surface bubble content of the crucibles manufactured by the methods of Embodiments 1 to 5 and Comparative Example 1 were measured. Here, the term "bubble content" means the ratio (W2/W1) of the area occupied by bubbles (W2) to a certain area (W1) of a quartz crucible. The bubble content as defined here can be measured nondestructively with an optical detecting means. To measure the bubble content to a certain depth from the surface, it suffices to scan the focal point of the detecting means to a certain depth from the surface. Such a method of nondestructively detecting the bubble content is described in detail in Japanese Patent No. 3,819,140; this method can be employed as is. Table 2 below gives the measurement results.

TABLE 2

Bubble content of various portions of the surface prior to the removal of the band of bubbles accumulated in the corner

| Bubble content (%) | Comparative Example 1 | Embodiments | | | | |
|---|---|---|---|---|---|---|
| | | 1 | 2 | 3 | 4 | 5 |
| Inner surface near opening end | 1.2 | <0.1 | <0.1 | <0.1 | <0.1 | <0.1 |
| Inner surface of corner portion | 0.5 | 0.8 | 1.3 | 1.3 | 0.5 | 0.6 |
| Inner surface in center of bottom portion | 0.1 | <0.1 | <0.1 | <0.1 | <0.1 | <0.1 |

TABLE 3

Bubble content (%) of various portions of the surface after removal of the band of bubbles accumulated in the corner

| Bubble content (%) | Comparative Example 1 | Embodiments | | | | |
|---|---|---|---|---|---|---|
| | | 1 | 2 | 3 | 4 | 5 |
| Inner surface near opening end | 1.2 | <0.1 | <0.1 | <0.1 | <0.1 | — |
| Inner surface of corner portion | 0.5 | <0.1 | <0.1 | <0.1 | <0.1 | — |
| Inner surface in center of bottom portion | 0.1 | <0.1 | <0.1 | <0.1 | <0.1 | — |

Based on the results given in Table 2, the inner surface of the silica glass crucibles manufactured by the method of the present invention had bubble contents of <0.1 percent in the inner surface near the opening end and in the inner surface in the center of the bottom portion. Further, based on the results given in Table 3, in the silica glass crucibles following the removal of the band of bubbles accumulated in the corner, the bubble content was <0.1 percent even in the inner surface of the corner portion.

The present invention is useful in fields relating to methods of manufacturing silica glass crucibles for pulling silicon single crystals.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing a silica glass crucible for pulling silicon single crystals comprising:
    feeding a quartz starting material powder into a rotating mold and forming a crucible-shaped molded product;
    imparting reduced pressure from the inner surface to the outer surface of the crucible-shaped molded product and arc-fusing the crucible-shaped molded product while rotating the product to form a silica glass crucible with a transparent layer on the inner surface side and a bubble layer on the outer surface side;
    fusing a second time by arc fusion the inner surface of the wall portion of the silica glass crucible to cause bubbles present in the transparent layer of the inner surface of the wall portion to be displaced toward the bottom portion of the inner surface of the wall portion; and
    fusing a second time by arc fusion the inner surface of the bottom portion of the silica glass crucible to cause bubbles present in the transparent layer of the inner surface of the bottom portion to be displaced toward the periphery of the inner surface of the bottom portion; and
    wherein either said fusing the second time by arc fusion the inner surface of the wall portion or the said fusing the second time by arc fusion the inner surface of the bottom portion is performed first to obtain a silica glass crucible in which bubbles are accumulated in the corner portions of the transparent layer formed on the inner surface of the wall portion and the inner surface of the bottom portion, and wherein the bubbles accumulated in the corner portions of the transparent layer are removed.

2. The method of manufacturing of claim 1, wherein in said fusing the second time by arc fusion the inner surface of the wall portion, the rotational speed of the silica glass crucible is made lower than the rotational speed during arc fusion of the crucible-shaped molded product, and the temperature when fusing the silica glass crucible a second time is made higher than the temperature during arc fusion of the crucible-shaped molded product.

3. The method of manufacturing of claim 1, wherein the rotational speed during arc fusion of the crucible-shaped molded product is set so that the gravitational acceleration exerted on the crucible-shaped molded product is 1.3 G or greater, and the rotational speed of the silica glass crucible in said fusing the second time by arc fusion the inner surface of the wall portion is set so that the gravitational acceleration exerted on the silica glass crucible is less than 1.3 G.

4. The method of manufacturing of claim 1, wherein in said fusing the second time by arc fusion the inner surface of the bottom portion, the rotational speed of the silica glass crucible is made greater than the rotational speed during arc fusion of the crucible-shaped molded product, and the second fusion temperature of the silica glass crucible is made higher than the temperature during arc fusion of the crucible-shaped molded product.

5. The method of manufacturing of claim 1, wherein the rotational speed during arc fusion of the crucible-shaped molded product is set so that the gravitational acceleration exerted on the crucible-shaped molded product is 1.7 G or less, and the rotational speed of the silica glass crucible in said fusing the second time by arc fusion the inner surface of the bottom portion is set so that the gravitational acceleration exerted on the silica glass crucible exceeds 1.7 G.

6. The method of manufacturing of claim 1, wherein the second fusing by arc fusion is conducted at a temperature of about 2,000° C.±200° C.

7. The method of manufacturing of claim 1, wherein the removal of the bubbles is conducted by grinding, etching, or secondary fusing.

8. The method of manufacturing of claim 7, wherein the secondary fusing of the ground or etched surface conducted after grinding or etching to render the surface smooth.

9. The method of manufacturing of claim 7, wherein the grinding is conducted with a sand blaster or a grinder.

10. The method of manufacturing of claim 7, wherein the etching is conducted with hydrofluoric acid.

11. The method of manufacturing of claim 7, wherein the secondary fusing is conducted by inclining an electrode toward the corner portions.

12. The method of manufacturing of claim 1, wherein said imparting reduced pressure is applied during at least part of the arc fusion process.

* * * * *

UNITED STATES PATENT AND TRADEMARK OFFICE
CERTIFICATE OF CORRECTION

| | | |
|---|---|---|
| PATENT NO. | : 8,091,384 B2 | Page 1 of 1 |
| APPLICATION NO. | : 12/351115 | |
| DATED | : January 10, 2012 | |
| INVENTOR(S) | : T. Sato et al. | |

It is certified that error appears in the above-identified patent and that said Letters Patent is hereby corrected as shown below:

At column 12, line 40 (claim 8, line 2) of the printed patent, please add "is" after "surface."

Signed and Sealed this
Third Day of April, 2012

David J. Kappos
*Director of the United States Patent and Trademark Office*